United States Patent Office 2,822,220
Patented Feb. 4, 1958

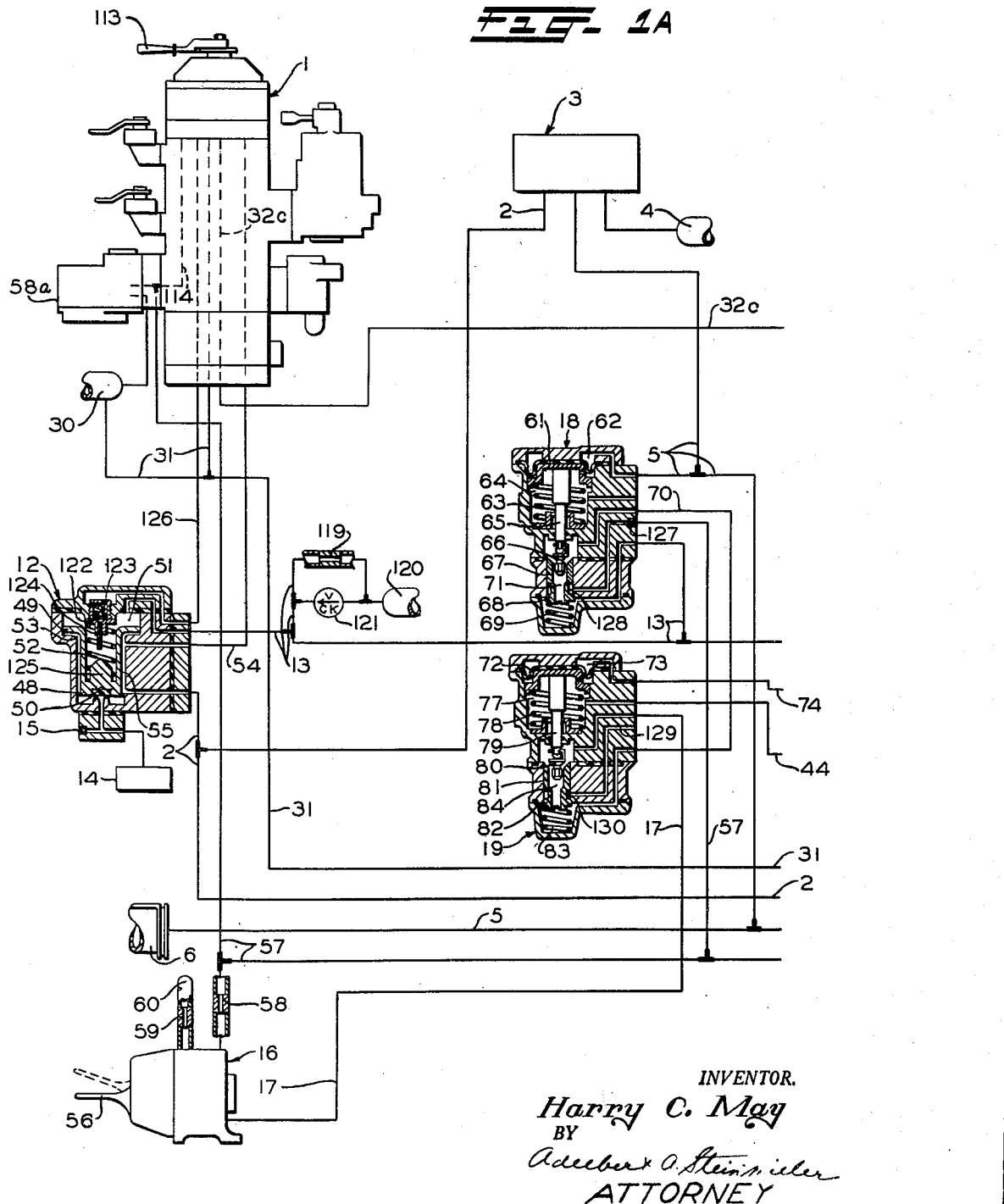

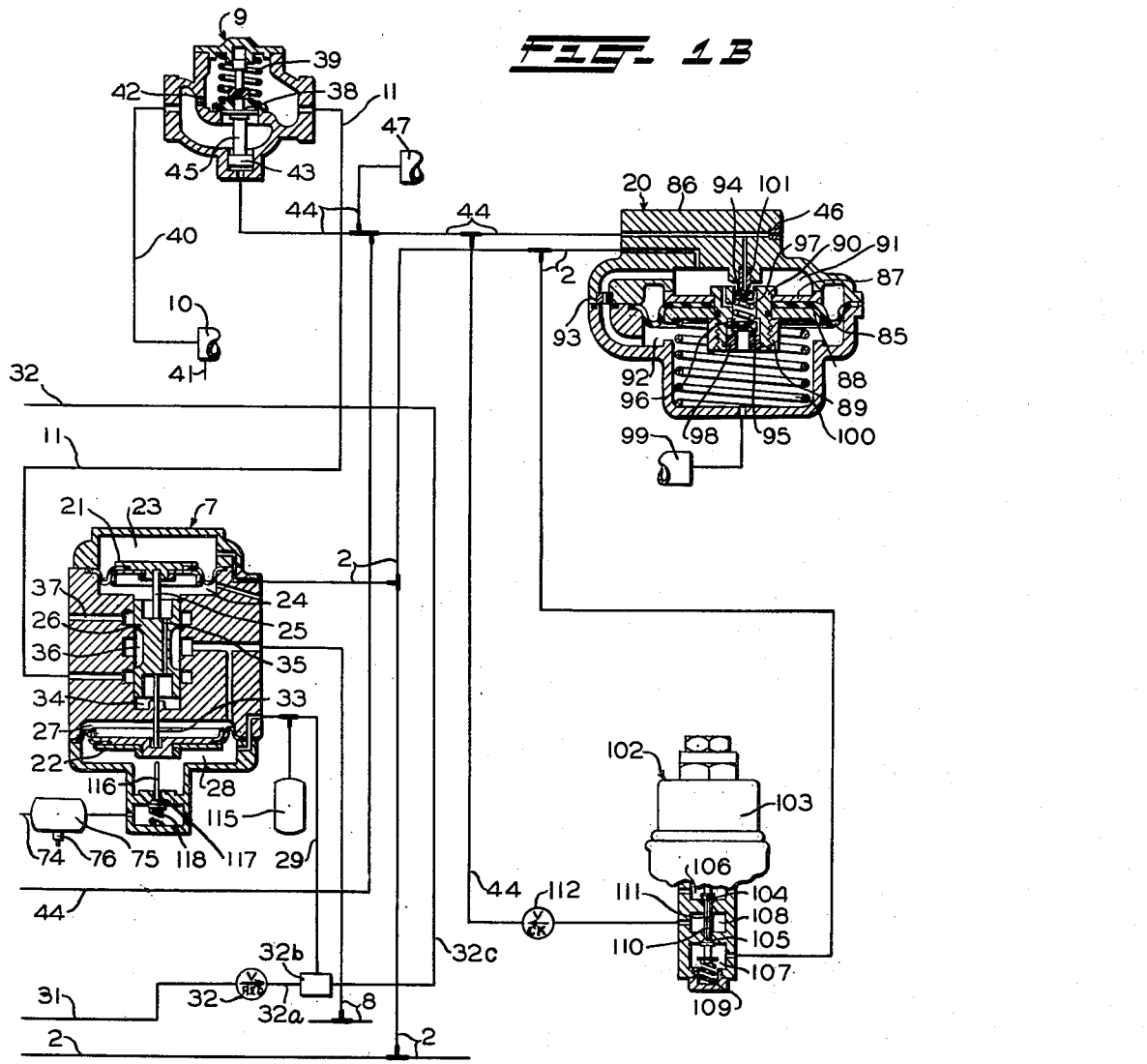

2,822,220

COMBINED FLUID PRESSURE AND VACUUM BRAKE APPARATUS

Harry C. May, East McKeesport, Pa., assignor to Westinghouse Air Brake Company, Wilmerding, Pa., a corporation of Pennsylvania Application December 28, 1956, Serial No. 631,333

11 Claims. (Cl. 303—4)

This invention relates to combined fluid presure and vacuum brake apparatus for controlling brakes on a railway locomotive on the automatic principle according to the extent of reduction in pressure of fluid in a brake pipe and controlling brakes on the connected cars of a train on the vacuum principle according to the extent of increase in pressure in a vacuum train pipe; this invention relating, more particularly, to an improved apparatus of the above type embodying means for preventing an undesired application of locomotive brakes during a release of an application of brakes on the locomotive and connected cars.

In apparatus of the above general type, it has heretofore been proposed to provide a vacuum control valve which, upon a loss of vacuum in the vacuum train pipe due to pull-apart while the brake pipe is fully charged, will operate to supply fluid under pressure to one chamber of a protection valve for causing it to operate to vent a chamber in an application valve for, in turn, causing the latter to operate to cut off locomotive power and also effect a reduction in brake pipe pressure for causing a service application of locomotive brakes. This vacuum control valve also responds to a reduction in brake pipe pressure on the locomotive to effect a proportionate increase in pressure in the vacuum train pipe for causing an application of the vacuum brakes on the connected cars, and responds to a subsequent increase in brake pipe pressure on the locomotive to connect the vacuum train pipe to a conduit open to the vacuum reservoir via a choke that sufficiently restricts flow to assure that a brake application will be effected in event of rupture of the vacuum train pipe. A quick release valve is provided for establishing a large capacity flow communication between the vacuum reservoir and conduit, in by-pass of the choke, so that the vacuum train pipe may be more quickly evacuated after a brake application so as to thereby cause vacuum brakes to more promptly release on the cars.

With arrangements heretofore proposed, it is necessary for the operator to manually (or pedally) effect energization of a magnet valve to cause the latter to supply the necessary fluid under pressure for causing opening of the quick release valve and also supply fluid under pressure to another chamber in the protection valve to prevent its operation by fluid under pressure supplied to said one chamber by operation of the vacuum control valve. Numerous instances have been reported of the operator failing to effect energization of this magnet valve when he moves the brake valve handle to running position for recharging the brake pipe to release brakes. In such event, the brake pipe will be recharged at a considerably faster rate than the vacuum train pipe will be exhausted through the aforementioned choke, especially if vacuum train pipe volume is great, as on a long train; and, if this should occur, the vacuum control valve will operate to supply fluid under pressure to said one chamber of the protection valve, just as if the vacuum train pipe had been ruptured by a pull-apart, and this, in turn, will cause an undesired service brake application on the locomotive, because the said other chamber of the protection valve will not be charged.

The principal object of this invention is therefore to provide an improved brake apparatus of the above general type embodying novel means for automatically, during a release of a brake application on the locomotive and cars of a train, supplying fluid under pressure to the said other chamber of the protection valve for a limited period of time and also opening the quick release valve to establish the aforementioned large capacity flow communication so that the vacuum train pipe will be exhausted rapidly enough to cause the vacuum control valve to operate to cut off supply of fluid under pressure to said one chamber of the protection valve before pressure in said other chamber has blown down, and thus prevent the above-described undesired application of locomotive brakes.

Another object is to provide an improved brake apparatus embodying means for automatically suppressing a pull-apart brake application on the locomotive for a period of time proportional to the degree of brake pipe pressure increase, for thereby promptly terminating such suppression when the need therefore no longer exists.

According to these objects, the improved brake apparatus embodies a novel differential pilot valve means controlled by brake pipe pressure opposing pressure of fluid in a certain chamber having restricted connection with the brake pipe. When brake pipe pressure is increased either to initially charge the apparatus or to release a brake application, this pilot valve means will operate automatically to supply brake pipe air to a pipe leading to the quick release valve and to a timing volume and to said other chamber of the protection valve for automatically opening said quick release valve and preventing operation of the protection valve (even if the magnet valve is not energized or no magnet valve is provided). When brake pipe pressure equalizes into said certain chamber, the differential pilot valve means will operate to terminate the supply of brake pipe air to said pipe; but operation of the protection valve will be suppressed and the quick release valve will be maintained open, until the timing volume has been substantially vented at the rate controlled by an atmospheric vent choke. A check valve is provided to permit pressure in said certain chamber to reduce at substantially the same rate as brake pipe pressure, in by-pass of the restricted connection, so that the differential pilot valve means may be immediately effective to cause opening of the quick release valve whenever brake pipe pressure is increased.

Other objects and advantages will become apparent from the following more detailed description of the invention and from the accompanying drawings, wherein the Figs. 1A and 1B, when taken together, such that the right end edge of Fig. 1A is matched to the left-hand edge of Fig. 1B, constitute a diagrammatic view of a brake apparatus embodying the invention.

Description

As shown in the drawings, the locomotive brake apparatus embodying the invention comprises an engineer's automatic brake valve device 1 operative, except during a pull-apart or a safety control brake application, to control pressure of fluid in a brake pipe 2 on the locomotive; a distributing valve device 3 responsive to a reduction in brake pipe pressure to supply fluid at a corresponding pressure from a supply reservoir 4 to a pipe 5 leading to the locomotive brake cylinders 6 (only one of which is shown); a vacuum control valve device 7 for normally controlling pressure in a vacuum train pipe 8, according to variations in brake pipe pressure, such that vacuum brakes on the connected cars of a train will be applied and released responsively to increases and decreases in pressure in the vacuum train pipe, in the well-known manner; a quick release valve device 9 for controlling a large capacity flow communication between a vacuum source, such as a vacuum reservoir 10, and a pipe 11 leading to the device 7; an application valve device 12 normally connecting the brake pipe 2 to the brake valve device 1 and responsive to venting of a pipe 13 to disconnect the brake pipe from the brake valve device and then connect the brake pipe to a pneumatic switch 14 for causing it to operate to cut off power to the locomotive and at the same time conect the brake pipe 2 to atmosphere via a service choke 15 for causing a service application of brakes on the locomotive; a safety control foot valve device 16 which must be pedally operated to maintain a pipe 17 and thereby (via a communication hereinafter described) the pipe 13 charged, for preventing a safety control brake application on the locomotive and connected cars; a suppression valve device 18 for automatically suppressing a safety control brake application, even if pipe 17 is vented, by supplying fluid under pressure to pipe 13 whenever brake cylinder pressure exceeds a preselected value; a protection valve device 19 that is fluid pressure operable by the vacuum control valve device 7 in event of pull-apart to vent pipe 13 for actuating the application valve device 12; and a novel differential pilot valve device 20 automatically responsive to an increase in brake pipe pressure to cause operation of the quick release valve device 9 to establish the aforementioned large capacity flow communication and also nullify operation of the protection valve device 19.

The vacuum control valve device 7 may comprise two coaxially arranged, cooperatively connected movable abutments 21 and 22 of different effective areas. The smaller movable abutment 21 is subject at its outer side to pressure of fluid in a chamber 23 open to a branch of brake pipe 2, and at its inner side to atmospheric pressure in a chamber 24. Movable abutment 21 is operatively connected, through the medium of a pusher stem 25, to a coaxially arranged spool valve 26 slidably mounted in a bore open to atmospheric chamber 24. The larger movable abutment 22 is subject at its inner side to pressure of fluid in a chamber 27 constantly open to the vacuum train pipe 8, and is subject at the opposite side to pressure of fluid in a chamber 28 constantly charged with fluid at least a preselected minimum pressure, via a pipe 29. Pipe 29 is normally charged from a main reservoir 30 via a main reservoir pipe 31, a reducing valve 32, a pipe 32a, and a double check valve 32b; said double check valve being of any well-known type operative to connect to pipe 29 either pipe 32a or a pipe 32c, according to which one of the pipes 32a or 32c is charged with fluid at the preponderant pressure. Pipe 32c is vented at the brake valve device 1 except during an emergency application of brakes.

Movable abutment 22 is operatively connected, through the medium of a pusher stem 33, to the spool valve 26; said pusher stem, intermediate its ends, having sealing, slidably guided contact with the wall of an aligned bore through a casing partition separating chamber 27 from a chamber 34, which is at the inner end of the spool valve bore and is constantly open to atmospheric chamber 24 via a suitable longitudinal passageway 35 through said spool valve, for balancing the pressures across the spool valve.

Intermediate its ends, the spool valve 26 has an elongated annular cavity 36 which is constantly open to the vacuum train pipe 8. The spool valve 26 controls, according to its position, connection of cavity 36 and hence vacuum train pipe 8 with an atmospheric vent port 37 and with the pipe 11 leading to valve device 9.

The quick release valve device 9 may comprise a disc-shaped check valve 38 normally biased by a helical spring 39 to a seated position for preventing large capacity flow between pipe 11 and a pipe 40 leading to the vacuum reservoir 10, which reservoir is connected via a pipe 41 to a vacuum exhauster (not shown). A choke 42 permits flow between the pipes 11 and 40 in by-pass of the check valve 38 for permitting vacuum in the vacuum train pipe 8 to be maintained against normal leakage by way of pipe 11 and the spool valve 26 of valve device 7 when the check valve 38 is seated. Arranged coaxially with check valve 38 is a piston 43 which responds to pressurization of a pipe 44 to unseat check valve 38 through the medium of a piston stem 45. The pipe 44 is connected to atmosphere via a timing choke 46 in valve device 20 and is also connected to a normally vented timing volume 47; said choke and volume serving to control the rate of blowdown of fluid pressure from pipe 44 for thereby controlling the period of time the check valve 38 is held unseated by piston 43.

The application valve device 12 may comprise two spaced coaxially connected pistons 48 and 49 of different diameters. Smaller piston 48 has in its outer face a disc-shaped valve 50 that controls connection of the brake pipe 2 with the power cut-off switch 14 and service choke 15. Larger piston 49 is subject at its outer face to pressure of fluid in a chamber 51, that is open to pipe 13, and to pressure of a helical bias spring 52; and said piston is subject at its inner face to pressure of fluid in a chamber 53 constantly open to a pipe 54 leading to the brake valve device 1. When chamber 51 is charged, the pistons 48 and 49 will be biased to a normal position, in which they are shown, and in which valve 50 is seated and an elongated annular groove or cavity 55 constantly open to chamber 53 connects pipe 54 to the brake pipe 2.

The safety control foot valve device 16 comprises, briefly, valve means (not shown) operative responsively to depression of a pedal 56 for supplying fluid under pressure from a pipe 57 via a choke 58 to the pipe 17, which is normally open to the pipe 13 via communication to be described. A feed valve device 58a, which is connected to the main reservoir 30, operates as a reducing valve to constantly provide in pipe 57 fluid at a preselected pressure, corresponding to a desired normal charge value of brake pipe pressure. The valve means of foot valve device 16 responds to spring-effected elevation of pedal 56, upon withdrawal of the operator's foot therefrom, to cut off pipe 57 from pipe 17 and connect the latter pipe to a vent choke 59 and pneumatically operated warning whistle 60, for causing a safety control brake application in the manner hereinafter to be described.

The suppression valve device 18 preferably comprises a movable abutment 61 which is subject at one side to fluid pressure in a chamber 62 open to a branch of brake cylinder pipe 5, and is subject at the opposite side to pressure of a helical bias spring 63 in an atmospheric chamber 64. When brake cylinder pressure in chamber 62 is less than a preselected value, movable abutment 61 will be biased by spring 63 to a normal position, in which it is shown, and in which it will, through the medium of a rod 65, hold a coaxially connected tapered valve 66 unseated from a tapered annular valve seat formed in one end of an aligned annular plunger 67, and cause a tapered suppression valve 68 formed integrally with the opposite end of said plunger to be seated by a helical bias spring 69 against a tapered annular valve seat in the casing. With valve 66 unseated, fluid under pressure will flow from a pipe 70, past unseated valve 66, and through the central opening 71 in the plunger 67 to the pipe 13.

Protection valve device 19 preferably comprises a movable abutment 72 which is subject at one side to fluid pressure in a chamber 73 open via a pipe 74 to a timing volume 75 that is connected to atmosphere via a choke 76 and is adapted to be charged with fluid under pressure by operation of the valve device 7, in the manner hereinafter to be described. Movable abutment 72 is subject at the opposite side to fluid pressure in a chamber 77, that is open to a branch of pipe 44, and to pressure of a helical bias spring 78 in said chamber. When chamber 73 is substantially vented, spring 78 will urge movable abutment 72 to a normal position, in which it is shown, and in which it will, through the medium of a rod 79, hold a coaxially connected tapered valve 80 unseated from a tapered annular valve seat formed in one end of an aligned annular plunger 81, and cause a tapered protection valve 82 formed integrally with the opposite end of said plunger to be seated by a helical bias spring 83 against a tapered annular valve seat in the casing. With valve 80 unseated, fluid under pressure will flow from pipe 17, past unseated valve 80 and through the central opening 84 in plunger 81 to pipe 70.

According to the invention, the differential pilot valve device 20 is provided for automatically supplying brake pipe air to the timing volume 47 and to pipe 44 for charging chamber 77 of protection valve device 19 and also actuating piston 43 to effect unseating of the release check valve 38 whenever brake pipe pressure is increased, such as during initial charging or during a release of brakes.

Valve device 20 preferably comprises an annular flexible diaphragm 85 suitably clamped about its outer edge between sections of a sectionalized casing 86 and about its inner edge between two annular follower plates 87 and 88; said follower plates being secured together by a clamping nut 89 that bears against plate 88 and has screw-threaded engagement with external threads formed on one end of an annular member 90 that passes through the central opening in said follower plates and has, near its opposite end, an outwardly directed shoulder that bears against the plate 87. Diaphragm 85 is subject, at its side facing plate 87, to pressure of fluid in a chamber 91 constantly open to a branch of brake pipe 2, and is subject at the opposite side to pressure of fluid in a chamber 92 constantly open to chamber 91 via a choke 93.

Disposed in the central opening through annular member 90 are two coaxially arranged disc-shaped check valves 94 and 95, between which is a chamber 96 constantly open to chamber 91. A helical bias spring 97 in chamber 96 biases valve 95 into seating contact with an annular valve seat member 98, suitably secured within the central opening through annular member 90, for preventing flow from chamber 91 via chamber 96 to chamber 92 in bypass of choke 93, but permitting substantially unrestricted flow in the reverse direction to thereby permit pressure in chamber 92 and in a timing volume 99 open to chamber 92 to reduce at the same rate and to substantially the same degree as brake pipe pressure is reduced.

When fluid pressures in chambers 91 and 92 are substantially equal, diaphragm 85 and its follower assemblage will be biased to a normal position, in which they are shown, by pressure of a helical bias spring 100 in chamber 92; said position being defined by contact of follower plate 87 with a stop in the casing. With diaphragm 85 in this position, valve 94 will be biased by spring 97 into seating contact with a coaxially arranged tapered annular valve seat 101 projecting from the end wall of chamber 91, for thereby preventing flow of brake pipe air from chamber 91 to pipe 44.

An operator-controlled valve device, such as a magnet valve device 102, is preferably provided (as with apparatus heretofore proposed), for permitting the operator, if he so desires, to suppress a pull-apart application of brakes on the locomotive and partially offset such application on the cars still connected to the locomotive. This valve device 102 may comprise a magnet 103 and two coaxially arranged, oppositely seating tapered valves 104 and 105 contained in an atmospheric chamber 106 and in a chamber 107, respectively, which chambers are separated by casing partitions from an intermediate chamber 108. Upon deenergization of magnet 103, a helical bias spring 109 in chamber 107 will seat valve 105 and, through abutting contact of its fluted valve stem 110 with the fluted valve stem 111 of valve 104, operatively unseat valve 104 for connecting chamber 108 to atmospheric chamber 106. A check valve 112 is interposed between chamber 108 and a branch of pipe 44 for preventing flow from pipe 44 to chamber 108 (and thence to atmosphere when valve 104 is unseated), but permitting flow in the reverse direction.

According to a feature of the invention, chamber 107 is connected to a branch of brake pipe 2 (instead of to the main reservoir via a choke, as heretofore proposed), for reasons hereinafter to be explained.

*Operation—initial charging*

Assume that the main reservoir 30 is fully charged; that the vacuum reservoir 10 is exhausted via the exhauster pipe 41; and that pedal 56 of foot valve device 16 is depressed.

To initially charge the apparatus, handle 113 of brake valve device 1 is moved to a running position for causing the usual rotary valve (not shown) to supply fluid at the normal charge value of brake pipe pressure (such as 70 p. s. i.) from the feed valve device 58a and a passage 114 to pipe 54, and thence via cavity 55 in application valve device 12 to the brake pipe 2 for charging the latter. From brake pipe 2, some fluid will flow to distributing valve device 3 for causing it to operate, in the well-known manner, to connect pipe 5 and hence the locomotive brake cylinders 6 to atmosphere.

Meanwhile, according to a feature of the invention, some fluid will also flow from brake pipe 2 to chamber 91 of differential pilot valve device 20 for causing diaphragm 85 and its follower assemblage to shift against resistance of bias spring 100 for operatively unseating valve 94 through the medium of an overlying flange on member 90. With valve 94 unseated, brake pipe air will flow from chamber 91 to pipe 44 and thence to timing volume 47 and also to release valve device 9 for shifting piston 43 and thereby operatively unseating check valve 38 against resistance of spring 39. With valve 38 unseated, the aforementioned large capacity flow communication will be established between pipe 11 and vacuum reservoir 10 in by-pass of choke 42.

Meanwhile, some fluid will also flow from brake pipe 2 to chamber 23 of vacuum control valve device 7 for causing the movable abutment stack 21, 22 to shift downwardly against the constant reference pressure, such as about 22 p. s. i., normally provided in chamber 28 and in a stabilizing volume 115 by the reducing valve 32 via pipe 32a, double check valve 32b and pipe 29. This will cause spool valve 26 to be shifted, through the medium of stem 25, to a release position, in which cavity 36 connects pipe 11 to the vacuum train pipe 8. Hence, with release check valve 38 automatically unseated by operation of valve device 20 and with spool valve 26 in its release position, a large capacity flow communication will be established between the vacuum reservoir 10 and the vacuum train pipe 8 for rapidly evacuating the train pipe to effect a prompt release of vacuum brakes on the connected cars.

When the vacuum train pipe 8 and hence chamber 27 is exhausted to a preselected normal degree, such as about 20" Hg, the movable abutment stack 21, 22 will be shifted upward, and thereby carry the spool valve 26 to a leakage maintaining position in which cavity 36 laps most of the opening to pipe 11, for restricting communication between the train pipe 8 and pipe 11 to a degree only sufficient to maintain vacuum in said train pipe against leakage.

As the brake pipe 2 is charged, brake pipe air will flow from chamber 91 of valve device 20 to chamber 92 and volume 99 at the restricted rate controlled by choke 93. When the differential across the diaphragm 85 is reduced to a preselected amount, such as about 2 p. s. i., as determined by the value of spring 100, said spring will shift the diaphragm and hence member 90 upwardly for permitting valve 94 to be seated by spring 97 to terminate flow of brake pipe air to pipe 44. Fluid under pressure in the previously charged timing volume 47 will then be effective to maintain pressure on the piston 43 to thereby maintain release check valve 38 unseated for a sufficient period of time to assure exhausting of the vacuum train pipe 8 to its normal value on a train having a maximum number of vacuum-brake-equipped cars and hence a maximum train pipe volume. When pressure in volume 47 has blown down to substantially atmospheric via choke 46, release check valve 38 will be seated by spring 39; whereupon vacuum reservoir 10 will be connected to pipe 11 solely via leakage maintaining choke 42 so that the train pipe vacuum may be maintained (via spool valve 26 in its leakage maintaining position) against leakage of a rate note exceeding the flow capacity of said choke.

During initial charging of the apparatus, chamber 62 of suppression valve device 18 will be vented via vented brake cylinder pipe 5; and hence valve 66 will be operatively maintained unseated by spring 63, and valve 68 will be held seated by spring 69.

Meanwhile, according to a feature of the invention, chamber 77 of protection valve device 19 will be automatically charged with fluid under pressure supplied to pipe 44 by operation of valve device 20. This pressure in chamber 77 will assist spring 78 in maintaining movable abutment 72 in normal position, in which it is shown, and in which valve 80 is unseated and valve 82 is seated by spring 83, even if (despite the large capacity flow between the volume reservoir 10 and train pipe established past the unseated release check valve 38) and movable abutment 22 of vacuum control valve device 7 should be moved downwardly sufficiently to force a valve stem 116 downward for unseating a tapered valve 117 against resistance of a helical bias spring 118 and thereby admit air at the preselected reduced pressure (illustratively assumed as 22 p. s. i.) from volume 115 past unseated valve 117 to volume 75 and, via pipe 74, to chamber 73 of the suppression valve device 19. Pressure in chamber 77 will blow down via choke 46, after seating of valve 94; and pressure in chamber 73 will blow down via choke 76 after valve 117 is reseated by spring 118 upon upward movement of the stack 21, 22 responsively to the decrease in train pipe pressure in chamber 27.

Hence, with pedal 56 of foot valve device 16 depressed, as initially assumed, the fluid under pressure thereby supplied via feed valve pipe 57 and choke 58 to pipe 17 will flow from pipe 17, past unseated valve 80 of device 19 and through opening 84 to pipe 70, and thence past unseated valve 66 and through opening 71 to pipe 13. From pipe 13 such fluid will flow to chamber 51 of application valve device 12 for maintaining the latter in normal position, in which cavity 55 connects pipe 54 to the brake pipe 2; and some of such fluid will also flow via a branch of pipe 13 and through a choke 119 to a volume 20 for storing a limited quantity of fluid under pressure.

Thus, at the completion of initial charging, all of the components of the brake apparatus will be in the respective positions in which they are shown in the drawings, with the possible exception of control valve device 7, the spool valve 26 of which may assume its previously defined leakage maintaining position.

*Service application of brakes*

To effect a service application of the brakes on the locomotive and connected cars of a train, the brake valve handle 113 is moved to a service position for causing a reduction in pressure of fluid in the pipe 54 and hence in the brake pipe 2, of a chosen degree; whereupon the brake valve handle is moved to a lap position for causing fluid in the brake pipe to be bottled up at the desired reduced pressure, in the well-known manner. The distributing valve device 3 responds to this chosen degree of reduction in brake pipe pressure, in the usual manner, to provide fluid at a corresponding pressure in pipe 5 and hence in the locomotive brake cylinders 6.

Meanwhile, brake pipe pressure will be reduced in chamber 23 of vacuum control valve device 7 and cause the spool valve 26 to be moved upwardly to an application position by fluid pressure in chamber 28 acting on the movable abutment stack in opposition to reduced brake pipe pressure in chamber 23 and pressure in chamber 27; fluid under pressure in volume 115 serving to stabilize the pressure in chamber 28 against displacement effect during movement of said stack. During this movement of spool valve 26, pipe 11 will be cut off from the train pipe 8, and then cavity 36 will connect the train pipe to vent port 37 for admitting atmospheric air to said train pipe and to chamber 27. When pressure in chamber 27 is thus increased to a degree corresponding to the chosen degree of increase in brake pipe pressure, the spool valve 26 will be shifted downwardly by the stack to a lap position, in which it is shown, for bottling up fluid in the train pipe at a corresponding pressure. The brake controlling valves (not shown) on the connected cars of the train will respond to this increase in pressure in the vacuum train pipe 8 to effect an application of brakes on said cars, in the usual manner.

If, while brakes are applied, leakage in the vacuum train pipe 8 should cause a slight increase in train pipe pressure, the spool valve 26 will be shifted downwardly from lap position to its leakage maintaining position, in which such leakage can be offset by flow from the train pipe to the vacuum reservoir 10 via pipe 11 and choke 42.

Meanwhile, according to a feature of the invention, as brake pipe pressure is reduced in chamber 91 and hence in chamber 96 of differential pilot valve device 20, check valve 95 will be unseated by preponderant fluid pressure in chamber 92 against resistance of spring 97 for permitting pressure in chamber 92 and in volume 99 to reduce at substantially the same rate as brake pipe pressure. This prompt reduction in pressure in chamber 92 will assure that the diaphragm 85 will be able to promptly deflect downwardly and thereby effect prompt unseating of valve 94 upon a subsequent increase in brake pipe pressure.

*Release of a brake application*

To release a brake application on the locomotive and connected cars of a train, brake valve handle 113 is moved to running position, for causing the brake pipe 2 to be recharged to its normal charge value and causing the distributing valve device 3 to operate to completely vent the locomotive brake cylinders 6, in the manner described in connection with initial charging.

Meanwhile, according to a feature of the invention, as soon as brake pipe pressure in chamber 91 of differential pilot valve device 20 exceeds the opposing pressure in chamber 92 by a slight degree, such as about 2 p. s. i., as determined by the bias effect of spring 100, diaphragm 85 will deflect downwardly and, through the medium of member 90, unseat valve 94 for supplying brake pipe air via chamber 91, to pipe 44 and volume 47.

Some of the fluid under pressure thus supplied to pipe 44 will shift piston 43 for operatively unseating release check valve 38 and thereby establishing the large capacity flow between vacuum reservoir 10 and train pipe 8; the spool valve 26 of vacuum control valve device 7 having, in the meantime, been shifted to its release position, in which pipe 11 is opened to the train pipe, in the manner fully described in connection with initial charging.

Meanwhile, some of the fluid under pressure supplied to pipe 44 will flow to chamber 77 of protection valve device 19 for assisting spring 78 in maintaining movable abutment 72 in normal position, even if, as discussed in connection with initial charging, valve 117 of device 7 should be temporarily unseated against resistance of spring 118 and supply fluid at the aforementioned preselected reduced pressure from volume 115 to chamber 75 and, via pipe 74, to chamber 73 of said device 19. The large capacity flow from the vacuum reservoir 10 to the train pipe 8 and hence to chamber 27 of device 7 should, however, quickly reduce the pressure in chamber 27 to a degree sufficient to permit the movable abutment stack 21, 22 to move upwardly, by assistance from spring 118 acting through stem 116, to an extent adequate enough to enable spring 118 to seat valve 117; spring 118 exerting a force on the stack equivalent to between 7″ Hg and 4″ Hg vacuum. Upon seating of valve 117, fluid under pressure in chamber 73 and volume 75 will be vented to atmosphere via and at the rate controlled by choke 76.

The valve 94 will be maintained open for supplying brake pipe air to pipe 44 and hence to chamber 77 of device 19 until pressure in chamber 92 and volume 99 has increased to within the illustrative 2 p. s. i. of brake pipe pressure in chamber 91; whereupon the diaphragm 85 will be deflected upwardly by spring 100, permitting valve 94 to be reseated by spring 97 so as to thereby terminate flow of brake pipe air to pipe 44. However, pressure in timing volume 47 will thereafter be effective to maintain chamber 77 charged and also maintain piston 43 in position for unseating release check valve 38 and thereby maintaining the large capacity flow between the vacuum reservoir 10 and pipe 11, until pressure in volume 47 has blown down to substantially atmospheric at the rate controlled by vent choke 46, by which time the volume 75 will have been vented via choke 76 and the train pipe will have been exhausted to its normal value via pipe 11 and the spool valve 26 of valve device 7.

When the train pipe 8 has been exhausted to its normal value, the spool valve 26 will move to its lap position or, if there is train pipe leakage, to its leakage maintaining position, as explained in connection with initial charging.

Hence, according to the invention, the differential pilot valve device 20 will operate automatically, during release of a brake application on the locomotive, to not only effect unseating of the release check valve 38 for causing vacuum in the train pipe 8 to be more promptly restored and thereby cause a more prompt release of vacuum brakes on the connected cars, but also to supply fluid under pressure to chamber 77 of the protection valve device 19 for preventing it from operating to vent chamber 51 of application valve device 12.

*Emergency application and release of brakes*

To effect an emergency application of brakes, brake valve handle 113 is moved to an emergency position for causing an emergency rate of reduction in pressure in the brake pipe 2 (which will cause the distributing valve device 3 to effect an emergency application of locomotive brakes) and also causing main reservoir air to be supplied from a branch of pipe 31 to passage and pipe 32c and thence via double check valve 32b to pipe 29 and chamber 28 of vacuum control valve device 7 for actuating the spool valve 26 to its application position more promptly than during a service application of brakes.

In all other respects, the operation of the apparatus will be similar to that described in connection with a service application of brakes, except, of course, that the spool valve 26 will remain in its application position, in which train pipe 8 is opened to atmosphere via vent port 37.

An emergency application of brakes is released in the same manner as described in connection with release of a service application.

*Safety control feature*

As previously noted, the improved brake apparatus embodies the usual safety control feature whereby a safety control brake application (preferably in the nature of an automatic service application of brakes) will be effected, except under a condition presently to be described, if the operator fails to maintain the pedal 56 of safety control valve device 16 depressed.

With pedal 56 depressed, valve device 16 will operate to cut off pipe 17 from choke 59 and whistle 60 and to supply fluid under pressure via feed valve pipe 57 and choke 58 to pipe 17. From pipe 17 such fluid will flow past unseated valve 80 of device 19 to pipe 70 and thence past unseated valve 66 of device 18 to pipe 13 for charging volume 120 via choke 119 and also charging chamber 51 of application valve device 12, for thereby causing pipe 54 to be maintained connected to the brake pipe 2, as described in connection with initial charging.

If the operator removes his foot from pedal 56, the valve means (not shown) of valve device 16 will be spring-actuated to cut off pipe 57 from pipe 17 and then open pipe 17 to atmosphere via choke 59 and whistle 60. Fluid under pressure will thereupon be released from pipe 13 via unseated valve 66, pipe 70, and unseated valve 80, to pipe 17, and thence to atmosphere via choke 59 and warning whistle 60. Meanwhile, fluid under pressure previously stored in volume 120 will then flow via a non-return check valve 121 to pipe 13, in by-pass of choke 119, for maintaining chamber 51 of valve device 12 charged for a short period of time, determined by the capacity of volume 120 and the capacity of choke 59.

If, upon sounding of the whistle 60, the operator does not promptly redepress the pedal 56, fluid pressure in chamber 51 will soon blow down to a degree where brake pipe pressure in chamber 53 of application valve device 12 will shift the connected pistons 48 and 49 to an application position against resistance of reduced pressure in chamber 51 and the bias of spring 52. In this position, pipe 54 is connected to chamber 53 by cavity 55 but is cut off from the brake pipe 2; and valve 50 is unseated for causing brake pipe air to flow past the lower end of piston 48 and past unseated valve 50 to the switch 14 for actuating it to cut off power to the locomotive and also causing brake pipe air to flow to atmosphere via service choke 15 for causing a service reduction in brake pipe pressure. This reduction in brake pipe pressure will cause a service application of brakes on the locomotive and of vacuum brakes on the connected cars, in the manner heretofore described.

Also, with pistons 48 and 49 in application position, a poppet valve 122 arranged coaxially with said pistons is unseated against resistance of a bias spring 123 through the medium of a fluted valve stem 124 that is then engaged by a projection 125 that is disposed in chamber 51 and extends from piston 48 in the direction of piston 49. With valve 122 unseated, chamber 51 and pipe 13 are connected to a pipe and passage 126 which, with brake valve handle 113 in running position, is then connected to atmosphere via the rotary valve (not shown) of device 1, for preventing suppression of the safety control brake application if the operator should belatedly depress the pedal 56 after such application has been initiated.

To release a safety control brake application, the operator must depress the pedal 56 and move the brake valve handle 113 to service position or lap position, in which positions the rotary valve cuts off pipe 126 from atmosphere and thereby permits chamber 51 of valve device 12 to be effectively recharged; whereupon he moves the brake valve handle to running position for recharging the brake pipe 2 and thereby causing brakes on the locomotive and cars to be released in the manner already described.

A safety control brake application is automatically suppressed, in the usual manner, whenever the operator manually effects a brake application (such as by moving brake valve handle 113 to service position) of a degree sufficient to provide a pressure of at least a preselected value, such as 25 p. s. i. (as determined by the value of spring 63) in the locomotive brake cylinders 6 and hence in chamber 62 of suppression valve device 18. Under this condition, movable abutment 61 of device 18 will move against resistance of spring 63 and, through the medium of rod 65, operatively seat valve 66 against plunger 67 for closing off pipe 70 from pipe 13 and then, through the medium of seated valve 66, shift said plunger for unseating valve 68 against resistance of spring 69. With valve 68 unseated, fluid under pressure will be supplied via a branch of feed valve pipe 57, a choke 127, and an elongated annular groove 128 formed in the exterior of the plunger intermediate the ends thereof, and thence past unseated valve 68 to pipe 13, for maintaining chamber 51 of valve device 12 charged in by-pass of the foot valve device 16. Thus, the operator may remove his foot from pedal 56 whenever and so long as brake cylinder pressure exceeds the illustrative 25 p. s. i.

*Pull-apart protection feature*

The pull-apart protection feature provides an automatic application of brakes on the locomotive and of vacuum brakes on the cars and cut-off of locomotive power in the event of rupture of the train pipe hose, such as due to pull apart of the train. This pull apart application may be completely suppressed on the locomotive and partly suppressed on the cars still connected to the locomotive, by operation of the valve device 102, in the manner presently to be described.

If with brake valve handle 113 in running position and the apparatus charged in the manner described in connection with initial charging, a hose connection in the vacuum train pipe 8 is parted, the consequent connection of the train pipe to atmosphere will cause an application of vacuum brakes on the parted cars and on the still connected cars. The consequent increase in pressure in train pipe chamber 27 of vacuum control valve device 7, assisted by brake pipe pressure in chamber 23, will cause the movable abutment stack 21, 22 to move downwardly and shift spool valve 26 to release position and also, through the medium of stem 116, unseat valve 117 against resistance of spring 118. With spool valve 26 in release position, the train pipe 8 will be connected to the vacuum reservoir 10 solely via choke 42, because pipe 44 will be vented via choke 46 and hence check valve 38 will be seated. However, with valve 117 unseated, fluid under pressure will flow from volume 115 (which is maintained charged via reducing valve 32 and double check valve 32b), through chamber 28 and past unseated valve 117, to volume 75 and thence via pipe 74 to chamber 73 of protection valve device 19. Chamber 77 will at this time be vented via pipe 44 and vent choke 46; and hence when pressure in chamber 73 exceeds a preslected value, such as 10 p. s. i., as determined by the value of spring 78, movable abutment 72 will be shifted downwardly against resistance of said spring and, through rod 79, seat valve 80 against plunger 81 for cutting off pipe 17 from pipe 70 and then, through seated valve 80, shift said plunger for unseating valve 82 against resistance of spring 83. With valve 82 unseated, pipe 70 will be connected to an atmospheric vent port 129 via an elongated annular cavity 130 intermediate the ends of plunger 81; said cavity then being opened to pipe 70 past unseated valve 82. Since the brake pipe 2 is still charged, the locomotive brake cylinders 6 and thus chamber 62 of suppression valve device 18 will be vented; and hence application valve chamber 51 and volume 120 will be rapidly vented via pipe 13, opening 71, unseated valve 66 and the then vented pipe 70, for causing the application valve device 2 to operate to actuate the locomotive power cut-off switch 14 and also connect the brake pipe 2 to atmosphere via service choke 15 for effecting an automatic service application of brakes on the locomotive, as in the manner described in connection with the safety control feature.

When locomotive brake cylinder pressure exceeds the illustrative 25 p. s. i., the suppression valve device 18 will operate to seat valve 66 for disconnecting pipe 70 from pipe 13, and then unseat valve 68 for supplying feed valve air via choke 127 to pipe 13; but this will be of no consequence because with application pistons 48 and 49 in application position, chamber 51 will be vented to atmosphere via the then unseated valve 122, pipe 126 and the brake valve device 1. Hence, to release brakes after a pull apart application, the brake valve handle 113 must be moved out of running position to lap or service position to cut off pipe 126 from atmosphere and thus permit effective recharging of the chamber 51 for returning pistons 48 and 49 to normal position, in which they are shown.

When a pull-apart occurs and it is desired to suppress a brake application on the locomotive, and insofar as possible, on the still connected cars, the operator must promptly (before too much vacuum is lost in the train pipe 8 at the locomotive) manually effect energization of magnet 103 of magnet valve device 102. Upon energization of magnet 103, valve 104 will be seated for cutting off chamber 108 from atmosphere, and valve 105 will be unseated for causing air to flow from the brake pipe 2, past unseated valve 105, to chamber 108 and thence via check valve 112 to pipe 44. Air is supplied to pipe 44 from the brake pipe 2 to prevent an undesirable build-up of air in the brake pipe which could otherwise occur, by backflow of air from pipe 44, past unseated valve 94 to the brake pipe, if the device 102 operated to supply air to pipe 44 from the main reservoir via a choke, as in apparatus heretofore proposed.

Some of the brake pipe air thus supplied to pipe 44 will flow to chamber 77 for maintaining movable abutment 72 in its normal position, despite the fact that the vacuum control valve device 7 will have operated to unseat valve 117 and supply fluid at reduced pressure (22 p. s. i.) from reducing valve 32, to chamber 73. With movable abutment 72 thus maintained in normal position, in which valve 80 is unseated and valve 82 is seated, supply of air to application valve chamber 51 will be maintained so long as foot valve pedal 56 is maintained depressed.

Some of the brake pipe air thus supplied to pipe 44 will also be effective to actuate piston 43 to operatively unseat release check valve 38 to thereby establish large capacity flow between vacuum reservoir 10 and train pipe via pipe 11 and spool valve 26 of control valve device 7; it being noted that said spool valve will then be in its release position, in which it connects pipe 11 to the train pipe 8. Under this condition, train pipe vacuum will be maintained, against the leak, to the full capacity of the exhauster (not shown), and cause movable abutment stack 21, 22 to move upward and thereby permit valve 117 to be reseated by spring 118; whereupon pressure in chamber 73 will blow down via choke 76. Vacuum brakes on the cars will, of course, apply to varying degrees according to their proximity to the source of leakage. However, so long as magnet 103 is maintained energized, power will be maintained on the locomotive and permit limited movement of the train to a place where repairs can be made.

*Summary*

It will thus be seen that the improved combined fluid pressure and vacuum brake apparatus embodies a novel differential pilot valve device 20 which operates automatically, during concurrent initial charging of a locomotive and connected cars and also during a release of a brake application, to supply brake pipe air to pipe 44 and timing volume 47 until pressure in chamber 92 and the volume 99 has increased to substantial equality with brake pipe pressure; whereupon supply of air to pipe 44 will be cut off and air in the timing volume 47 will blow down to atmosphere via choke 46. Air supplied to pipe 44 will charge chamber 77 of protection valve device for preventing the latter from operating to initiate a pull-apart application of brakes, and the air supplied to pipe 44 will also actuate piston 43 to effect unseating of release check valve 38 for establishing large capacity flow between the vacuum reservoir 10 and pipe 11 leading to the spool valve 26 of vacuum control valve device 7, which spool valve will then be in its release position, in which it connects pipe 11 to the vacuum train pipe 8.

With the brake apparatus embodying the invention, the operator is relieved of the necessity of manually effecting energization of the magnet valve device 102, except under two conditions: (1) when he desires to suppress a pull-apart application and (2) when the locomotive, with its brake pipe 2 fully charged, is moved into position to couple it to a train of cars in which the vacuum train pipe 8 is at atmospheric pressure; for under these two conditions, the pressure in chamber 92 of device 20 will be equal to brake pipe pressure in chamber 91, and hence valve device 20 will not then operate to supply fluid under pressure to pipe 44 for unseating the release check valve 38 and preventing operation of the protection valve device 19.

Having now described the invention, what I claim as new and desire to secure by Letters Patent, is:

1. In a combined fluid pressure and vacuum brake apparatus, the combination of a brake pipe the pressure of fluid in which is reduced and increased for respectively causing an application and a release of locomotive brakes, a vacuum train pipe, a vacuum source, a conduit, flow-restricting means interposed between said conduit and vacuum source, vacuum control valve means responsive to a reduction in brake pipe pressure to admit atmospheric air to said vacuum train pipe for causing an application of brakes on the connected cars of a train to a degree corresponding to the degree of brake pipe pressure reduction, said vacuum control valve means being responsive to an increase in brake pipe pressure to connect the vacuum train pipe to said conduit for causing a release of brakes on the connected cars, normally closed quick release valve means operable by fluid pressure to an open position for establishing a large capacity flow communication between said vacuum source and conduit in by-pass of said flow-restricting means, and other valve means automatically responsive to an increase in brake pipe pressure to supply fluid under pressure to said quick release valve means for actuating the latter to open position.

2. In a combined fluid pressure and vacuum brake apparatus, the combination of a brake pipe, means responsive to a reduction in brake pipe pressure below a normal charge value to effect an application of locomotive brakes and responsive to a subsequent increase in brake pipe pressure to effect a release of locomotive brakes, a vacuum train pipe, a vacuum source, a conduit, flow-restricting means interposed between said conduit and vacuum source, vacuum control valve means controlled by brake pipe pressure and train pipe pressure acting in opposition to a reference pressure and responsive to a reduction in brake pipe pressure to admit atmospheric air to said vacuum train pipe for causing an application of brakes on the connected cars of a train to a degree corresponding to the degree of brake pipe pressure reduction, said vacuum control valve means being responsive to an increase in brake pipe pressure to connect the vacuum train pipe to said conduit for causing a release of brakes on the connected cars, normally closed quick release valve means operable by fluid pressure to an open position for establishing a large capacity flow communication between said vacuum source and conduit in by-pass of said flow-restricting means, other valve means subject to brake pipe pressure and to an opposing pressure of fluid in a chamber open to the brake pipe via a restricted connection and automatically responsive to an increase in brake pipe pressure above said opposing pressure to supply fluid under pressure to said quick release valve means for actuating the latter to open position, and one-way flow means for permitting substantially unrestricted flow from said chamber to said brake pipe in by-pass of said restricted connection and preventing such unrestricted flow in the reverse direction.

3. In a combined fluid pressure and vacuum brake apparatus, the combination of a normally charged brake pipe, means responsive to a reduction in brake pipe pressure below normal charge value to effect an application of locomotive brakes and responsive to a subsequent increase in brake pipe pressure to effect a release of locomotive brakes, a vacuum train pipe, a vacuum source, a conduit, flow-restricting means interposed between said conduit and vacuum source, vacuum control valve means controlled by brake pipe pressure and train pipe pressure acting in opposition to a reference pressure and responsive to a reduction in brake pipe pressure to admit atmospheric air to said vacuum train pipe for causing an application of brakes on the connected cars of a train to a degree corresponding to the degree of brake pipe pressure reduction, said vacuum control valve means being responsive to an increase in brake pipe pressure to connect the vacuum train pipe to said conduit for causing a release of brakes on the connected cars, a timing volume open to atmosphere via a restriction, quick release valve means responsive to pressure of fluid in said timing volume in excess of a chosen small value to open a large capacity flow communication between said conduit and vacuum source in by-pass of said flow-restricting means, another volume having a restricted connection with the brake pipe, check valve means permitting substantially unrestricted flow from said other volume to the brake pipe in by-pass of the restricted connection and preventing such unrestricted flow in the reverse direction, and other valve means controlled by brake pipe pressure opposing fluid pressure in said other volume and a constant bias and automatically responsive to an increase in brake pipe pressure over pressure in said other volume to supply fluid under pressure to said timing volume and responsive to substantial equalization of fluid pressure in said other volume with brake pipe pressure to terminate such supply of fluid under pressure to said timing volume.

4. In a combined fluid pressure and vacuum brake apparatus, the combination of a normally charged brake pipe, means responsive to a reduction in brake pipe pressure below normal charge value to effect an application of locomotive brakes and responsive to a subsequent increase in brake pipe pressure to effect a release of locomotive brakes, a vacuum train pipe, a vacuum source, a conduit, flow-restricting means interposed between said conduit and vacuum source, vacuum control valve means controlled by brake pipe pressure and train pipe pressure acting in opposition to a reference pressure and responsive to a reduction in brake pipe pressure to admit atmospheric air to said vacuum train pipe for causing an application of brakes on the connected cars of a train to a degree corresponding to the degree of brake pipe pressure reduction, said vacuum control valve means being responsive to an increase in brake pipe pressure to connect the vacuum train pipe to said conduit for causing a release of brakes on the connected cars, a timing volume open to atmosphere via a restriction, quick release valve means responsive to pressure of fluid in said timing volume in excess of a chosen small value to open a large capacity flow communication between said conduit and vacuum source in by-pass of said flow-restricting means, another volume having a restricted connection with the brake pipe, check valve means permitting substantially unrestricted flow from said chamber to the brake pipe in by-pass of the restricted connection and preventing such unrestricted flow in the reverse direction, other valve means controlled by brake pipe pressure opposing fluid pressure in said other volume and a constant bias and automatically responsive to an increase in brake pipe pressure over pressure in said other volume to supply fluid under pressure from said brake pipe to said timing volume and responsive to substantial equalization of fluid pressure in said other volume with brake pipe pressure to terminate such supply of fluid under pressure to said timing volume, and operator-controlled valve means for supplying fluid under pressure from the brake pipe to said timing volume in by-pass of said other valve means for thereby permitting said timing volume to be charged when pressures in said other volume and brake pipe are substantially equal.

5. In a combined fluid pressure and vacuum brake apparatus, the combination of a normally charged brake pipe, means responsive to a reduction in brake pipe pressure below normal charge value to effect an application of locomotive brakes and responsive to a subsequent increase in brake pipe pressure to effect a release of locomotive brakes, a vacuum train pipe in which pressure is increased for causing an application of brakes on the connected cars of a train and in which pressure is reduced for causing a release of brakes on said cars, a vacuum source, a conduit, flow-restricting means interposed between said conduit and vacuum source, means defining a communication via which fluid under pressure is normally conveyed to a first chamber, application valve means responsive to release of fluid under pressure from said first chamber to connect the brake pipe to atmosphere, protection valve means normally in one position and operative to another position responsively to preponderance of fluid pressure in a second chamber over that in a third chamber for closing said communication and releasing fluid under pressure from said first chamber, vacuum control valve means controlled by brake pipe pressure and train pipe pressure acting in opposition to a reference pressure and responsive to a reduction in brake pipe pressure to admit atmospheric air to said train pipe and responsive to an increase, selectively, in brake pipe pressure or in train pipe pressure to connect the train pipe to said conduit and supply fluid under pressure to said second chamber, normally closed quick release valve means operable by fluid pressure to an open position for establishing large capacity flow between said vacuum source and conduit in by-pass of said flow-restricting means, other valve means subject to brake pipe pressure and an opposing pressure of fluid in a fourth chamber open to the brake pipe via a restricted connection and automatically responsive to an increase in brake pipe pressure over pressure in said fourth chamber to supply fluid under pressure to said quick release valve means for actuating the latter to open position and also supply fluid under pressure to said third chamber for preventing operation of said protection valve means from its said one position to its said other position, said other valve means being responsive to substantial equalization of pressure in said fourth chamber with that in said brake pipe to terminate such supply to said quick release valve means and third chamber.

6. The combination according to claim 5, including check valve means for permitting substantially unrestricted flow from said fourth chamber to said brake pipe in by-pass of said restricted connection and preventing such unrestricted flow in the reverse direction, choke means opening said second chamber to atmosphere, and choke means opening said third chamber to atmosphere.

7. In a combined fluid pressure and vacuum brake apparatus, the combination of a normally charged brake pipe, means responsive to a reduction in brake pipe pressure below normal charge value to effect an application of locomotive brakes and responsive to a subsequent increase in brake pipe pressure to effect a release of locomotive brakes, a vacuum train pipe in which pressure is increased for causing an application of brakes on the connected cars of a train and reduced for causing a release of brakes on said cars, a vacuum source, a conduit, flow-restricting means interposed between said conduit and vacuum source, means defining a communication via which fluid under pressure is normally conveyed to a first chamber, application valve means responsive to release of fluid under pressure from said first chamber to connect the brake pipe to atmosphere, protection valve means normally in one position and operative to another position responsively to preponderance of fluid pressure in a second chamber over that in a third chamber for closing said communication and releasing fluid under pressure from said first chamber, vacuum control valve means controlled by brake pipe pressure and train pipe pressure acting in opposition to a reference fluid pressure and responsive to a reduction in brake pipe pressure to admit atmospheric air to said train pipe and responsive to an increase, selectively, in brake pipe pressure or in train pipe pressure to connect the train pipe to said conduit and also supply fluid at said reference pressure to said second chamber, normally closed quick release valve means operable by fluid pressure to an open position for establishing large capacity flow between said vacuum source and conduit in by-pass of said flow-restricting means, and operator-controlled valve means for supplying fluid under pressure from the brake pipe to said quick release valve means for actuating the latter to open position and also supplying fluid under pressure from the brake pipe to said third chamber for preventing operation of said protection valve means from its said one position to its other position.

8. In a combined fluid pressure and vacuum brake apparatus, the combination of a normally charged brake pipe, locomotive brake controlling valve means responsive to a reduction in brake pipe pressure below normal charge value to effect an application of locomotive brakes and responsive to a subsequent increase in brake pipe pressure to effect a release of locomotive brakes, a vacuum train pipe in which pressure is increased for causing an application of brakes on the connected cars and in which pressure is reduced for causing a release of brakes on said cars, a vacuum source, a conduit, choke means interposed between said conduit and vacuum source, a timing volume open to atmosphere via a restriction, quick release valve means responsive to pressure of fluid in said timing volume in excess of a chosen small value to establish large capacity flow between said conduit and vacuum source in by-pass of said choke means, another volume having a restricted connection with the brake pipe, one-way-flow means permitting substantially unrestricted flow from said other volume to the brake pipe in by-pass of the restricted connection and preventing such unrestricted flow in the reverse direction, differential pilot valve means responsive to an increase in brake pipe pressure over the pressure in said other volume to connect the brake pipe to said timing volume and responsive to substantial equalization of pressures in said other volume and brake pipe to disconnect the brake pipe from said timing volume, means defining a communication via which fluid under pressure is normally conveyed to a chamber, application valve means responsive to venting of said chamber to connect the brake pipe to atmosphere, a third volume open to atmosphere via a restriction, protection valve means normally in one position and operative to another position responsively to preponderance of fluid pressure in said third volume over that in said timing volume to close said communication and vent said chamber, and vacuum control valve means controlled by brake pipe pressure and train pipe pressure acting in opposition to a relatively low reference fluid pressure and responsive to a reduction in brake pipe pressure to admit atmospheric air to said train pipe and responsive to an increase, selectively, in brake pipe pressure or in train pipe pressure to connect said train pipe to said conduit and also supply fluid at said reference fluid pressure to said third volume, whereby said differential pilot valve means will operate to charge said timing volume for suppressing operation of said protection valve means from its said one position to its said other position upon an increase in brake pipe pressure but will be ineffective to charge said timing volume for suppressing such operation of said protection valve means upon an increase in train pipe pressure while brake pipe pressure is maintained substantially equal to pressure in said other volume.

9. The combination according to claim 8, including operator-controlled valve means for supplying fluid under pressure from the brake pipe to said timing volume in by-pass of said differential pilot valve means for thereby permitting said timing volume to be charged when pressures in said other volume and brake pipe are substantially equal.

10. The combination according to claim 8, including a source of constant fluid pressure, and a brake cylinder in which pressure is controlled by the locomotive brake controlling valve means, and wherein the communication defining means comprises suppression valve means normally opening one branch of said communication leading from said protection valve means to said chamber, and operator-controlled valve means for supplying fluid under pressure from said source to another branch of said communication leading to said protection valve means, said protection valve means in its said one position connecting said one and other branches of said communication, said suppression valve means being responsive to a pressure in excess of a predetermined value in said brake cylinder to close said one branch of said communication and connect said source to said chamber in by-pass of said communication.

11. In a combined fluid pressure and vacuum brake apparatus, the combination of a normally charged brake pipe, means responsive to a reduction in brake pipe pressure below normal charge value to effect an application of locomotive brakes and responsive to a subsequent increase in brake pipe pressure to effect a release of locomotive brakes, a vacuum train pipe in which pressure is increased for causing an application of brakes on the connected cars of a train and in which pressure is reduced for causing a release of brakes on said cars, a vacuum source, means defining a communication via which fluid under pressure is normally conveyed to a first chamber, application valve means responsive to release of fluid under pressure from said first chamber to connect the brake pipe to atmosphere, protection valve means normally in one position and operative to another position responsively to preponderance of fluid pressure in a second chamber over that in a third chamber for closing said communication and releasing fluid under pressure from said first chamber, vacuum control valve means controlled by brake pipe pressure and train pipe pressure acting in opposition to a reference pressure and responsive to a reduction in brake pipe pressure to admit atmospheric air to said train pipe and responsive to an increase, selectively, in brake pipe pressure or in train pipe pressure to connect the train pipe to said vacuum source and supply fluid under pressure to said second chamber, other valve means subject to brake pipe pressure and an opposing pressure of fluid in a fourth chamber open to the brake pipe via a restricted connection and automatically responsive to an increase in brake pipe pressure over pressure in said fourth chamber to supply fluid under pressure to said third chamber for preventing operation of said protection valve means from its said one position to its said other position, said other valve means being responsive to substantial equalization of pressure in said fourth chamber with that in said brake pipe to terminate such supply to said third chamber, whereby said other valve means will prevent operation of said protection valve means to its said other position when said vacuum control means operates to supply fluid under pressure to said second chamber responsively to an increase in brake pipe pressure but will be ineffective to prevent such operation of said protection valve means when said vacuum control means operates to supply fluid under pressure to said second chamber responsively to an increase in train pipe pressure.

References Cited in the file of this patent

UNITED STATES PATENTS

| | | |
|---|---|---|
| 1,471,073 | Thomas | Oct. 16, 1923 |
| 1,943,574 | Winter | Jan. 16, 1934 |